United States Patent [19]
Bernstein et al.

[11] Patent Number: 6,157,644
[45] Date of Patent: Dec. 5, 2000

[54] METHOD AND APPARATUS FOR ACCELERATING OSI LAYER 3 ROUTERS

[75] Inventors: Gregory M. Bernstein, Fremont, Calif.; Alan Chapman, Kanata, Canada; Philip Edholm, Fremont, Calif.; Jeffrey T. Gullicksen, San Jose, Calif.; Kenneth Gullicksen, Campbell, Calif.

[73] Assignee: Northern Telecom Limited, Montreal, Canada

[21] Appl. No.: 08/946,431

[22] Filed: Oct. 7, 1997

[51] Int. Cl.⁷ .................................................. H04L 12/28
[52] U.S. Cl. .......................... 370/392; 370/389; 370/400; 370/401
[58] Field of Search .................................. 370/389, 410, 370/400, 401, 402, 392, 351, 356, 395

[56] References Cited

U.S. PATENT DOCUMENTS

| | | | |
|---|---|---|---|
| 5,398,245 | 3/1995 | Harriman, Jr. .......................... | 370/389 |
| 5,546,390 | 8/1996 | Stone .................................... | 370/408 |
| 5,550,816 | 8/1996 | Hardwick et al. ...................... | 370/397 |
| 5,566,170 | 10/1996 | Bakke et al. ........................... | 370/392 |
| 5,598,410 | 1/1997 | Stone .................................... | 370/469 |
| 5,835,710 | 11/1998 | Nagami et al. ......................... | 370/351 |
| 5,920,566 | 7/1999 | Hendel et al. .......................... | 370/356 |
| 5,920,699 | 7/1999 | Bare ...................................... | 370/395 |

OTHER PUBLICATIONS

RND, "F.I.R.S.T: Fast Intranet Routed Switching Technology," White Paper, www.rndnetworks.com, (Jan. 1997).

Comer, D., "Internetworking with TCP/IP,", vol. 1, Prentice–Hall, 3rd Ed. pp. 20–32, 89–107, 109–121, 123–133 (1995).

Rekhter, Y., "Inter–domain routing: EGP, BGP, and IDRP," in Steenstrup, M. *Routing in Communications Networks*, 1st Ed, pp. 99–133. (1995).

*Primary Examiner*—Chi H. Pham
*Assistant Examiner*—Brenda H. Pham
*Attorney, Agent, or Firm*—Morrison & Foerster LLP

[57] ABSTRACT

Methods and apparatus for accelerating a router in a communications network are described. In one embodiment, a router accelerator includes a forwarding table for associatively storing a destination address and a next hop address. If a destination address of a packet matches a destination address in the forwarding table, then logic forwards the packet to a next hop. A router may be coupled to at least one network port through the router accelerator. In another approach, the network includes at least one host and at least one router. The host has at least one routing table for associatively storing a second-level destination address, a second-level next hop address and a first-level next hop address. A router accelerator includes redirect logic for storing the second-level destination address in a second-level next hop address entry in the at least one host routing table. This causes the host to request a first-level next hop address corresponding to the second-level destination address. An accelerator table responds to the host's request with the bound first-level next hop address. In another approach employing host routing tables, a router accelerator includes request logic for requesting from the router a second-level next hop address in response to the first-level next hop address. Redirect logic stores the second-level next hop address in a second-level next hop address entry in the at least one host routing table. This causes the host to request a first-level next hop address corresponding to the second-level next hop address.

36 Claims, 11 Drawing Sheets

| I.P. DESTINATION ADDRESS | LAYER 2 ADDRESS | DESTINATION PORT | TIME TO EXIST |
|---|---|---|---|
| | | | |
| | | | |
| ⋮ | | | |

*Figure 7*

| I.P. DESTINATION ADDRESS | INPUT PORT |
|---|---|
| | |
| | |
| ⋮ | |

| DESTINATION IP ADDRESS | NEXT HOP IP ADDRESS |
|---|---|
| | |
| | |
| ⋮ | ⋮ |
| ANY OTHER ADDRESS | DEFAULT IP ADDRESS |

*Figure 10A*

| NEXT HOP IP ADDRESS | NEXT HOP PHYSICAL ADDRESS |
|---|---|
| | |
| | |
| ⋮ | ⋮ |

| DESTINATION IP ADDRESS | NEXT HOP PHYSICAL ADDRESS |
|---|---|
| | |

*Figure 12*

| NEXT HOP IP ADDRESS | NEXT HOP PHYSICAL ADDRESS |
|---|---|
| | |

METHOD AND APPARATUS FOR ACCELERATING OSI LAYER 3 ROUTERS

BACKGROUND

1. Field of the Invention

The present invention relates to the field of routing messages in a communications network, and in particular to increasing the throughput of a routing system.

2. Description of the Related Art

In recent years, there has been an exponential increase in the demand for bandwidth in communications networks. This increase is due to a variety of factors, including an increase in the number of users as the Internet moves towards becoming a mass communications medium, and an increase in bandwidth-intensive multimedia applications that integrate still images, video and speech with data. To keep up with this increasing demand, communications facilities must frequently be upgraded.

Data routers are critical components in data communications networks. Routers link physical networks along the path from a source node to a destination node. In a network employing packet switching, data packets are passed from router to router until they reach their final destination. This process is known as "next hop routing."

Figure 1:
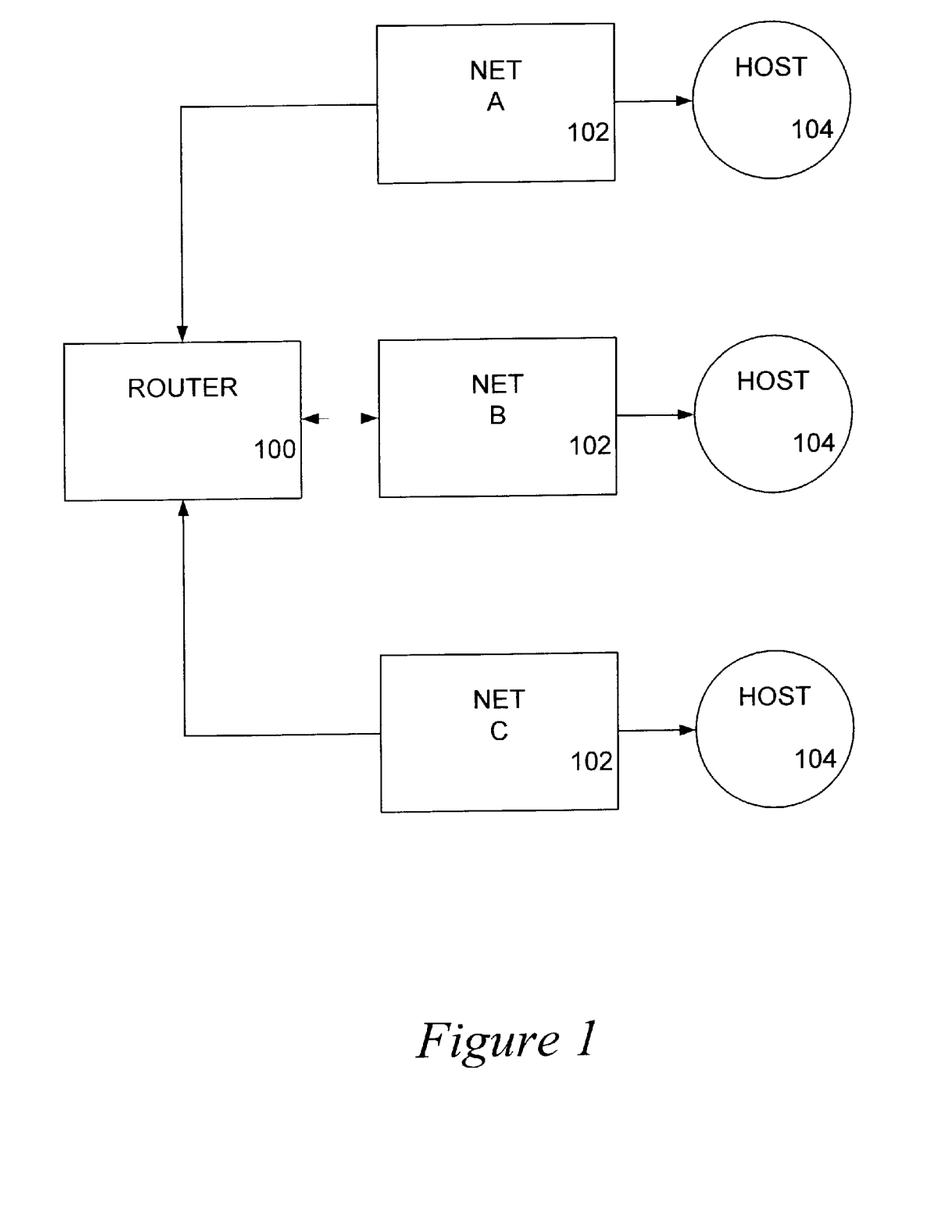
FIG. 1 illustrates a conventional communications network of the type that employs next hop routing.

FIG. 1 illustrates a conventional communications network of the type that employs next hop routing. In this example, a router 100 couples three networks 102. Each network 102 includes at least one host computer 104. Software in the router 100 implements an Internet protocol (IP) routing algorithm that determines how to send an IP datagram across the networks. The Internet protocol operates at layer 3 of the well-known layered OSI standard. For a host 104 to transfer an IP datagram to another host 104, the sender encapsulates the datagram in a physical frame ("packet"), wherein the destination IP address is mapped to a physical (layer 2) address. If the source and destination hosts lie within the same physical network, such as an Ethernet, then the source can send the datagram directly to the destination over the physical network.

Figure 2:
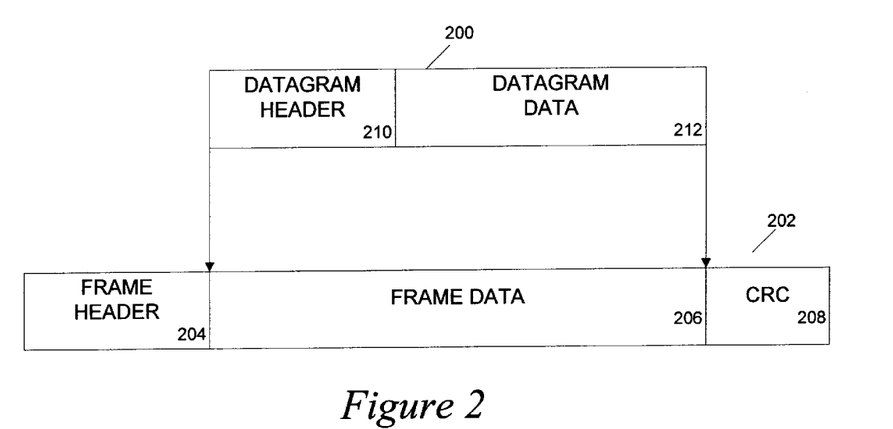
FIG. 2 illustrates the format of an IP data gram in capsulated in a physical frame.

FIG. 2 illustrates the format of an IP datagram 200 encapsulated in a physical frame 202. The frame 202 includes a frame header 204 followed by frame data 206 and a cyclic redundancy check code 208. The IP datagram 200, which is encapsulated as frame data 206, includes a datagram header 210 and datagram data 212.

Figure 3:
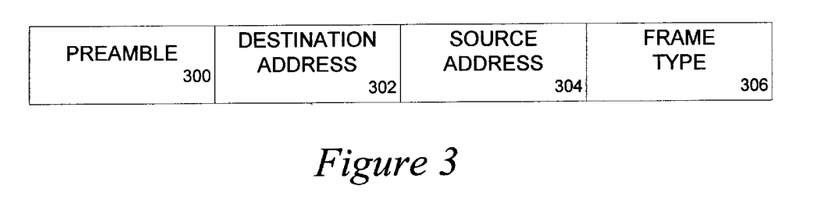
FIG. 3 illustrates the format of a physical frame header.

FIG. 3 illustrates the format of a physical frame header 204, such as an Ethernet frame header. The frame header 204 includes a preamble 300, a destination address 302, a source address 304, and a frame type field 306. The preamble is employed for synchronization purposes. The destination address 302 contains the physical (layer 2) address of the destination node, which is unique to each hardware unit and is hard-coded into the hardware at the time of manufacture. The source address 304 is the physical address of the source node.

Figure 4:
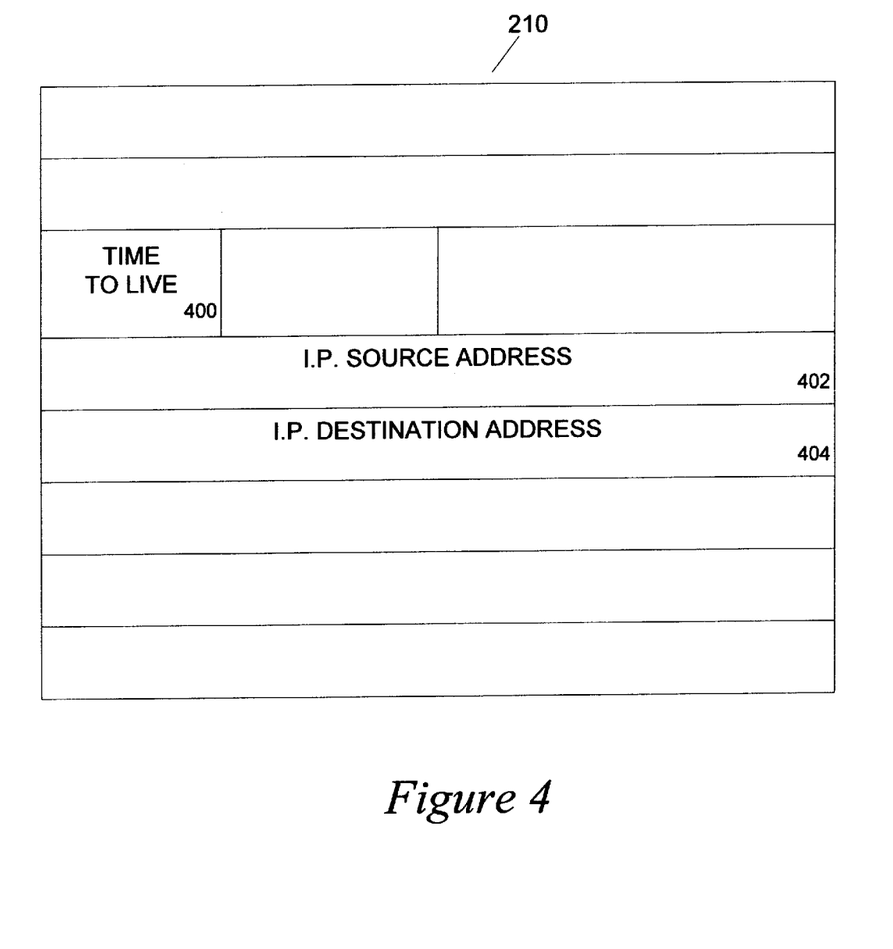
FIG. 4 illustrates the format of a IP datagram header.

FIG. 4 illustrates the format of an IP datagram header 210, showing only fields that are relevant to the present invention. The fields include a time to live field 400, an IP source address 402, and an IP destination address 404. For further information regarding frame formatting and networking in general, please refer to D. Comer, *Internetworking With TCP/IP*," Volume 1, Prentice-Hall, Third Edition, 1995, which is incorporated by reference herein.

If the source and destination lie in different networks, then the router is employed to effect the transfer. Both hosts and routers maintain IP routing tables to determine where to send a datagram based upon the IP destination address. Typically a routing table contains pairs (N, R), where N is the IP address of a destination network or host, and R is the IP address of the next router along the path to network or host N. In this manner, a router need not know the complete path to a destination node, only the next hop. The next hop in a machine's routing table must lie in a physical network to which the machine connects directly. To assure selection of the proper next hop, routers exchange routing tables to keep track of changes in network configuration.

After executing a routing algorithm to obtain the next hop IP address in response to the ultimate destination address of a datagram, the router passes the datagram and the next hop address to network interface software in the router responsible for the physical network over which the datagram must be sent. The network interface software binds the next hop address to a physical address, forms a frame using that physical address, places the datagram in the data portion of the frame, and sends the resulting frame to a second (next hop) router over the physical network linking the next hop router to the first router. This process continues until the datagram reaches a final router that is connected directly to the same physical network as the destination. At that point, the final router will deliver the datagram using direct delivery.

After using the next hop address to find a physical address, the network interface software discards the next hop address. If the host is sending a sequence of datagrams to the same destination address, this process of determining the next hop IP address and then the next hop physical address is repeated, even though it appears very inefficient. As is well known in the art, the binding between the next hop IP address and the physical address is not saved because of the philosophy underlying the Internet protocol. The protocol builds an abstraction that hides the details of one network layer from another, thereby maintaining the distinction between the IP and physical address layers.

Because router functions, such as exchanging routing tables and executing routing algorithms require the flexibility of software to react to a changing environment, these functions are implemented in software rather than hardware. Thus, the capacity of routers is limited to the capacity of the microprocessors and the software that implement the necessary algorithms.

In order to increase data throughput, some routers have been designed in hardware to overcome the limitations of software. For example, Rekhter describes systems that contain local forwarding tables in switches, known as "forwarding information bases." Each table entry includes an ultimate destination address and a next hop destination address. The forwarding information base is constructed from information contained in a "routing information base" that in turn is constructed from routing information received from the network. For further information please refer to Y. Rekhter, "Inter-domain routing: EGP, BGP, and IDRP," in M. Steenstrup, *Routing in Communications Networks,* First Edition, 1995, pp. 99–133. Forwarding tables are also employed in U.S. Pat. No. 5,566,170 issued to Bakke et al. These and all other references referred to herein are incorporated by reference herein.

Further, other hardware-accelerated routers cache next hop information. Although these hardware routers increase throughput, replacing existing routers with these advanced routers is an expensive proposition. The expense is not just the cost of the router itself, but the administrative costs incurred in configuring the new router and the cost of associated network downtime. Accordingly, it is desired to find a more cost-effective way of upgrading existing routing systems to increase data capacity.

SUMMARY OF THE INVENTION

The present invention provides methods and apparatus for accelerating a router in a communications network. In one embodiment, a router accelerator includes a forwarding table for associatively storing a destination address and a next hop address. If a destination address of a packet matches a destination address in the forwarding table, then logic forwards the packet to a next hop. The destination address may be a network address, and the next hop address may be a physical address.

A router may be coupled to at least one network port through the router accelerator. The router binds the next hop address to the destination address of the packet if the packet destination address does not match a destination address in the forwarding table. The router does not process a packet if the packet destination matches in the forwarding table.

A router history table associatively stores at least one destination address and a corresponding address of the network port that received a packet having that destination address. Each forwarding table may be associated with a network port. The accelerator stores the next hop address in the forwarding table for a particular port if that port is associated in the history table with a destination address that is bound to the next hop address.

In another embodiment, the network includes at least one host and at least one router. The host has at least one routing table for associatively storing a second-level destination address, a second-level next hop address and a first-level next hop address. The router binds a first-level next hop address to a second-level destination address. A router accelerator includes redirect logic for storing the second-level destination address in a second-level next hop address entry in the at least one host routing table. This causes the host to request a first-level next hop address corresponding to the second-level destination address. An accelerator table associatively stores the bound second-level destination address and first-level next hop address. The accelerator table responds to the host's request with the bound first-level next hop address.

The first-level addresses may be physical addresses, and the second-level addresses may be network addresses. The router may be coupled to at least one network port through the router accelerator.

The host associatively stores the bound second-level destination address and first-level next hop address in a host forwarding table. The host forwards a packet to a next hop if a second-level destination address of the packet matches a second-level destination address in the host forwarding table. A router coupled to the accelerator does not process the packet if the second-level destination address of the packet matches a second-level destination address in the host forwarding table.

In another embodiment employing host routing tables, a router accelerator includes request logic for requesting from the router a second-level next hop address in response to the first-level next hop address. Redirect logic stores the second-level next hop address in a second-level next hop address entry in the at least one host routing table. This causes the host to request a first-level next hop address corresponding to the second-level next hop address. An accelerator tables associatively stores the corresponding second-level next hop address and first-level next hop address. The accelerator table responds to the host's request with the bound first-level next hop address.

DETAILED DESCRIPTION OF THE INVENTION

The present invention provides methods and apparatus for accelerating OSI layer 3 routing. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

Figure 5:
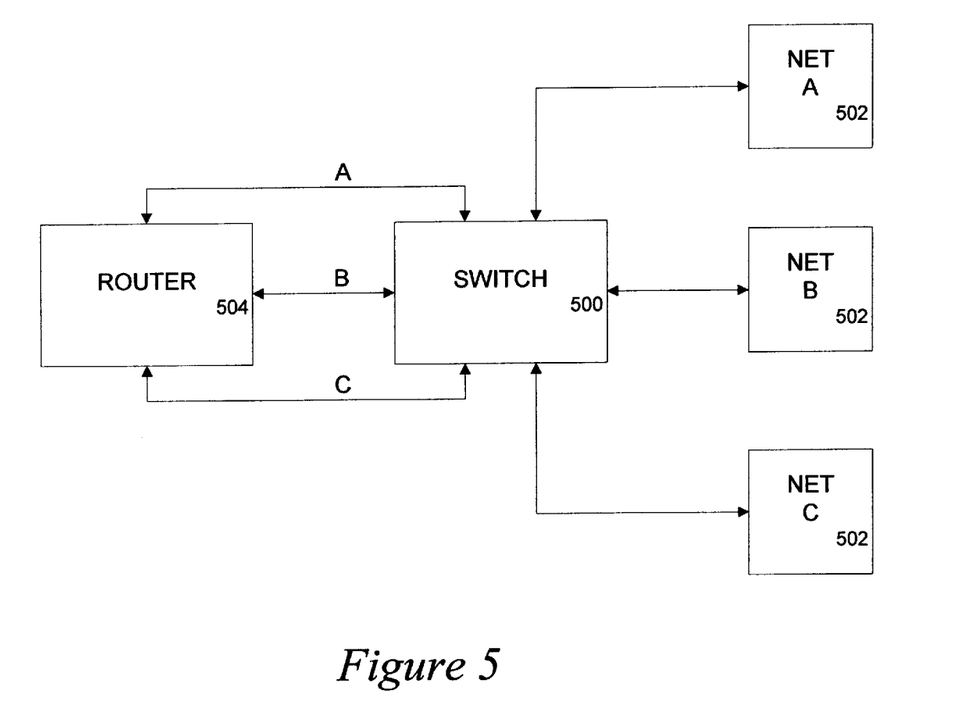
FIG. 5 is a communications network incorporating a router accelerator switch of the present invention.

The present invention provides a means whereby existing routing systems may be upgraded to increase throughput at low cost. FIG. 5 illustrates a communications network incorporating a router accelerator switch 500 of the present invention. The networks 502, the switch 500 and the router 504 may form a wide-area network that connects a number of geographically-dispersed networks together. Alternatively, the networks 502 may be local-area networks at a given site, perhaps in different buildings or of different types, such as a fiber-optic token ring network or an Ethernet. In the description that follows, it will be assumed for simplicity that the networks are Ethernet local area networks. Further, although three networks 502 are illustrated, many more networks would be connected in most actual installations.

The router accelerator switch 500 of the present invention is independent of the design of the router 504, the routing algorithms and the network topology. The accelerator 500 may be installed in a conventional routing system by simply unplugging the router 504 from the network connections, connecting the accelerator to those connections, and plugging the router 504 into the accelerator switch 500. Through the operation described below, the accelerator switch 500 is transparent to both the networks 502 and the router 504, except that the router 504 will appear to have a much larger capacity for switching packets.

The distinction between a router and a switch is somewhat arbitrary, but generally lies in the level of sophistication of the mechanisms used to determine the next hop destination, and the extent to which the system communicates with other parts of the network to exchange information from routing tables. For purposes of this application, a router performs the function of calculating a next hop destination by communicating with other parts of the network to monitor the network configuration. Conversely, for purposes of the application, a conventional switch is assumed not to perform any calculations to determine the route of a packet, but simply forwards the packet according to next hop information provided by the router.

According to the present invention, the switch of the invention is connected between the network ports and the routing system in order to intercept packets transmitted to and from the router. The switch acts as a "shadow router" to observe and mimic some of the router's functions. By doing so, the switch need not receive instructions from the router in order to route every packet.

In one embodiment, the switch records the next hop physical address computed by the router for a packet. The switch then usurps the next hop routing function of the router for subsequent packets directed to the same destination.

Figure 6:
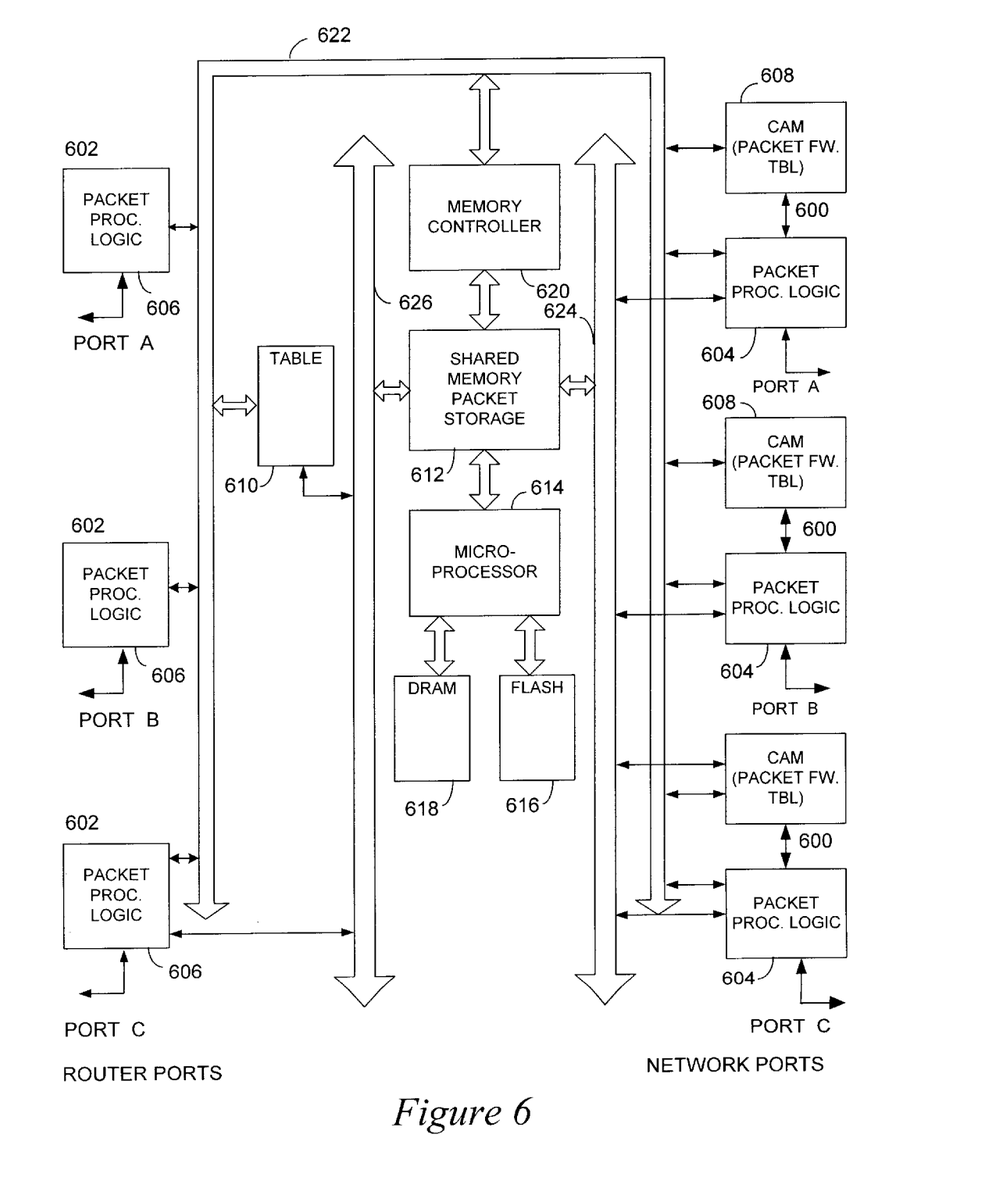
FIG. 6 illustrates a router accelerator switch according to the first embodiment to the present invention.

FIG. 6 illustrates a router accelerator switch 500 according to a first embodiment of the present invention. The switch includes three ports 600 connected to three corresponding networks (not shown), and three ports 602 connected to corresponding ports of a router (not shown). The ports correspond one-to-one with each other to maintain the transparency of the switch. Each port includes packet processing logic (PPL) (604 on network side, 606 on router side) for handling layer 2 and layer 3 communications with, for example, an Ethernet network. The PPL circuitry may be implemented using standard Ethernet interface chips.

Each port 600 on the network side is coupled to a first content addressable memory 608 (CAM) that implements a packet forwarding table (PFT) of the invention. On the router side, the switch includes a table 610, implemented with a CAM, which acts as a router history table of the invention. Shared memory packet storage 612 acts as a queue for storing packets, with one queue per router/network port. The packet storage is shared by both the router ports and the network ports. A microprocessor 614 executes programs stored in flash memory 616 and uses DRAM memory 618 for temporary storage. A memory controller 620 controls transfer of the packets among the router ports 602, the network ports 600 and the shared memory 612. The memory controller 620 keeps track of the location of packets in memory. It is also responsible for notifying the microprocessor of an overflow. Control signals are transferred throughout the switch over a control bus 622. Data is transferred between the shared memory 612 and the network ports 600 over a first data bus 624, whereas data is transferred between the router ports 602 and shared memory 612 over a second data bus 626.

Figure 7:
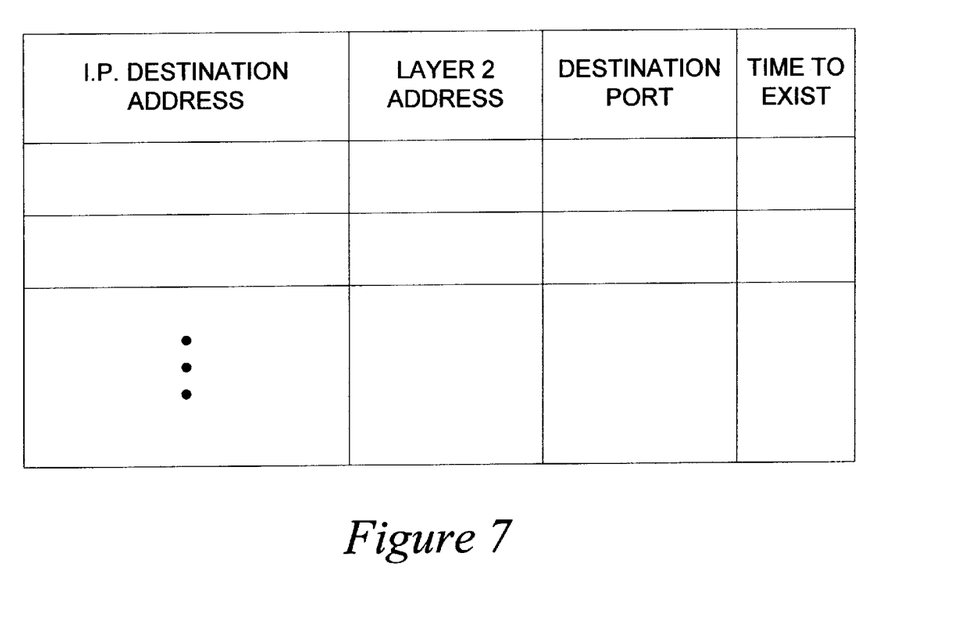
FIG. 7 illustrates the data structure for a packet forwarding table of the present invention.

FIG. 7 illustrates the data structure for the packet forwarding table 608. The packet forwarding table 608 associatively stores the IP address of the ultimate destination of a packet, the layer 2 (physical) address of the next hop, an indicator of the network-side port linked to the next hop (destination port), and a time to exist (aging) field indicating how long the address entry is to remain in the table. Because the switch must be transparent to the router and the network, the destination port is the same port at which the packet was received from the router side.

Figure 8:
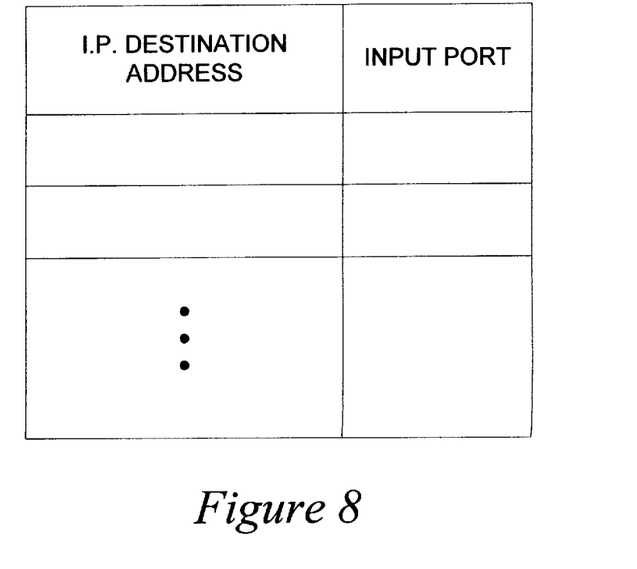
FIG. 8 illustrates the data structure of a router history table of the present invention.

FIG. 8 illustrates the data structure of the router history table 610. The router history table 610 associatively stores the IP destination address along with the port at which the router received a packet having the associated IP destination address.

Figure 9:
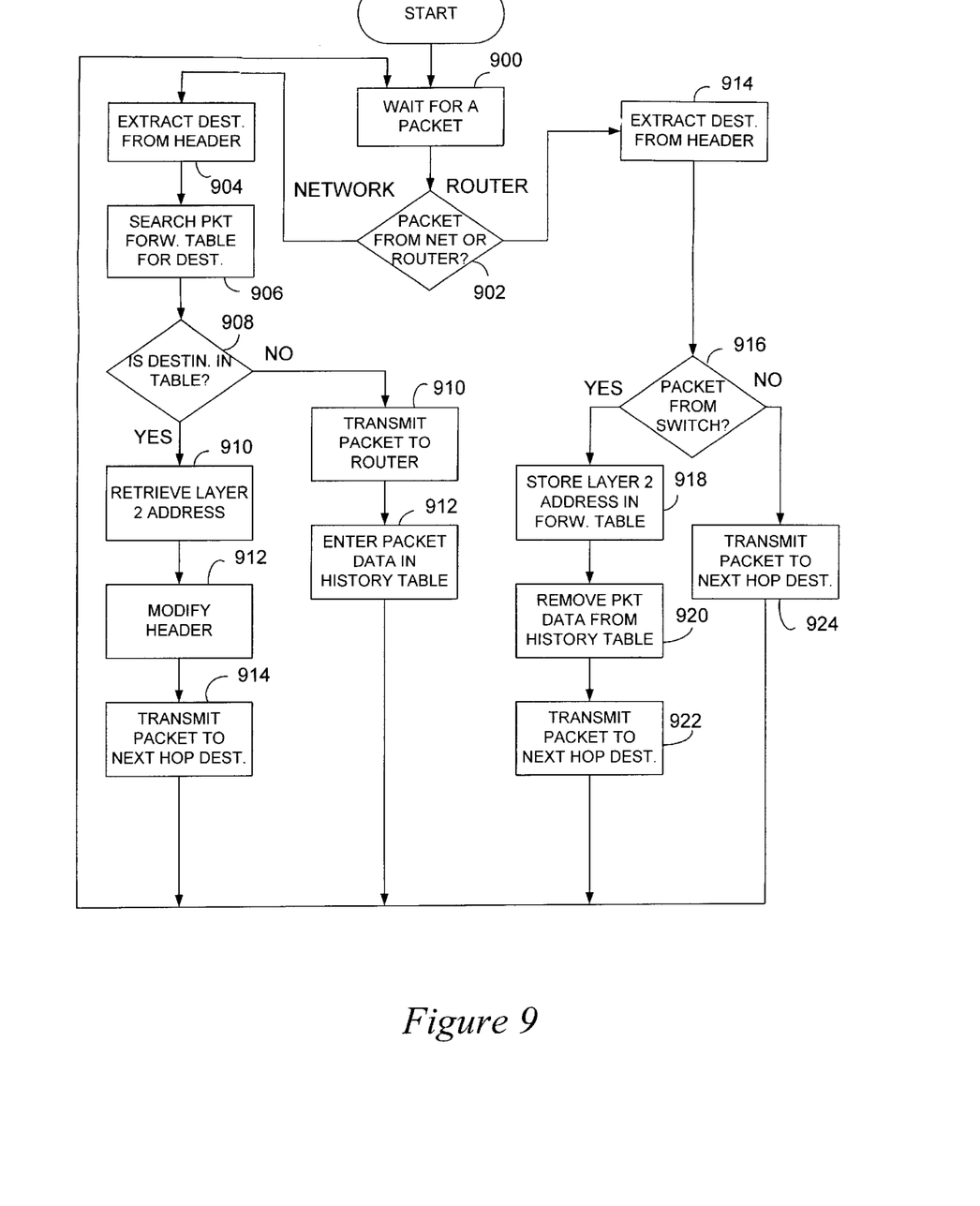
FIG. 9 is a flow chart illustrating the operation of the router accelerator switch of the present invention.

Referring to the flow chart of FIG. 9, the router accelerator switch of the present invention operates as follows. The switch waits for a packet to arrive either at a network-side port or a router-side port (step 900). When a packet is received over one of the network ports (step 902) as being directed to the router as a next hop, it is intercepted by the router accelerator switch at the switch's associated network port input. The PPL 604 then extracts the IP destination address from the packet frame (step 904) and forwards it to the port's packet-forwarding table for comparison with the IP destination addresses stored in the CAM of the PFT (steps 906, 908). The packet processing logic 604 also instructs the memory controller to store the packet in the shared memory packet storage.

If the IP destination address does not match an address in the packet forwarding table, then the packet processing logic instructs the memory controller over the control bus to transmit the packet from shared memory to the corresponding router port over the router-side data bus, so that the packet may be processed by the router (step 910).

Upon receiving the packet, the router performs its usual function of computing the next hop layer 2 (physical) address. After doing so, the router transmits the packet back to the switch over the appropriate router-side port leading to the next hop destination (steps 900, 902). The packet returned to the switch by the router is encapsulated in a physical frame having the next hop layer 2 address in the frame header. The router-side packet processing logic 606 of the switch at the port receiving the returning packet instructs the memory controller to store this packet in shared memory. Further, under instructions from the router-side packet processing logic 606, the memory controller also causes the IP destination address and input port identifier to be stored in the router history table (step 912).

The router-side PPL 606 then extracts the IP destination address from the packet header (step 914). The PPL then causes the destination address to be compared to the addresses in the router history table (step 916). If there is a hit, then this indicates that the packet was previously sent to the router by the router accelerator switch.

In response to a hit, the network-side packet processing logic instructs the memory controller to extract the IP destination address and the layer 2 next hop address from the packet stored in shared memory. The memory controller then stores this data in the packet forwarding table (or tables) for the ports indicated by the router history table as corresponding to the associated IP destination address (or addresses) (step 918). After the next hop information is stored in the packet forwarding table, the router history table deletes the entry for the corresponding destination address (step 920).

The router-side packet processing logic 606 forwards the returned packet to the next hop destination through the network port corresponding to the router port serving as output, which is not necessarily the network port from which the packet was received (step 922).

At this point, the packet forwarding table now stores the address binding for a first packet in a stream of packets directed towards a particular destination, where the packet has been processed by the router. If the next received packet is from the network, then the network-side packet processing logic 604 for the input port causes the memory controller 620 to store the packet in shared memory 612 and to extract the destination address from the IP datagram header (steps 900, 902, 904). The packet processing logic then causes the IP destination address to be input to the associated packet forwarding table (step 906). If the table indicates a hit, then the table transfers the associated physical (layer 2) next hop address to the packet processing logic (steps 908, 910). The packet processing logic causes the memory controller to forward the IP datagram to the packet processing logic 604, which encapsulates the datagram in a frame including the layer 2 next hop address (step 912). The packet processing logic 604 then forwards the frame to the next hop destination on the appropriate output port (step 914).

In some instances, a packet is originated at the router (steps 902, 904). Such packets typically convey status information, such as data to update routing tables. The router encapsulates these packets in a physical frame specifying the next hop destination. Router-generated packets are not stored in the router history table. The router-side packet processing logic that received the router-generated packet stores the frame in a shared memory queue. The memory is logically subdivided into a queue for each output port. When it is found by the router-side PPL that the packet originated from the router, then the PPL forwards the packet to shared memory. When the packet reaches the top of the queue, it is transmitted from the corresponding output port (step 924).

Packets addressed directly to the router's IP address from the network are sent by the receiving port's network-side PPL to the router, but not entered in the router history table because it is not expected that the router will return them.

The first embodiment described above relies entirely on tables stored in the switch. The following second and third embodiments may be deemed "host-centric" because they store relevant routing information in pre-existing routing tables in the host.

The host-centric router accelerator relies upon host routing tables that can perform the address resolution protocol (ARP) function. To perform ARP, a host sends out a broadcast message to all nodes within its broadcast domain, i.e., local area network. The ARP message contains an IP destination address and a request for the node having that address to transmit back its physical address. In this manner, the host binds an IP address to a physical address.

Figure 10A:
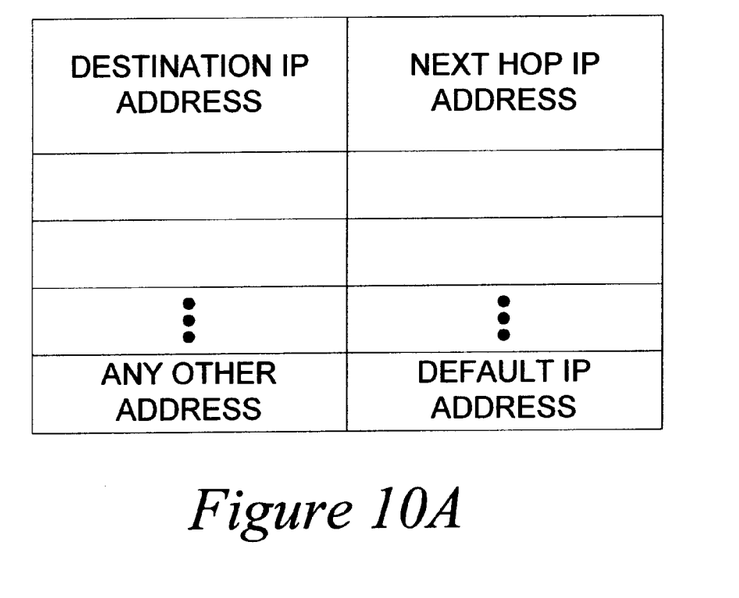
FIG. 10A illustrates a first host routing table employed by the present invention.
Figure 10B:
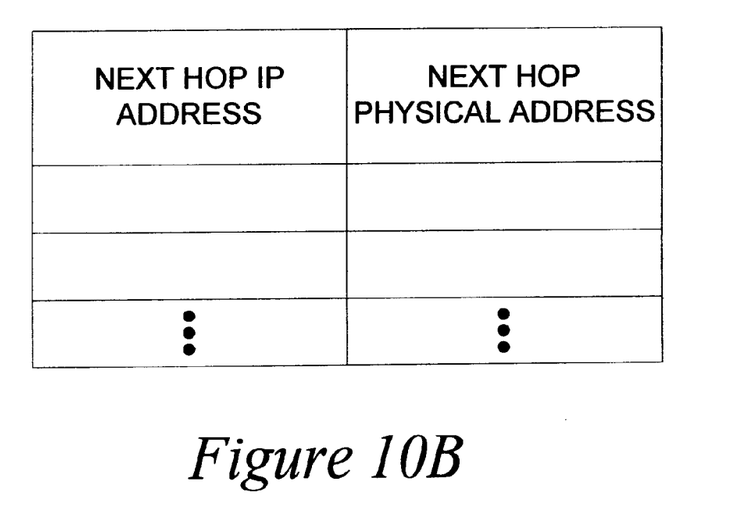
FIG. 10B illustrates a second routing table employed by the present invention.

FIGS. 10A and 10B illustrate relevant entries in two routing tables found in a conventional host. The first table associatively stores a destination IP (second-level) address along with a corresponding next hop IP (second-level) address. The second table, known as the host ARP cache or forwarding table, associatively stores a next hop IP (second-level) address along with the corresponding next hop physical (first-level) address. These two tables together effectively provide a mapping of destination IP address to next hop physical address. The reason two tables are employed is that the address boundary between the layers is maintained by using this format.

Figure 11:
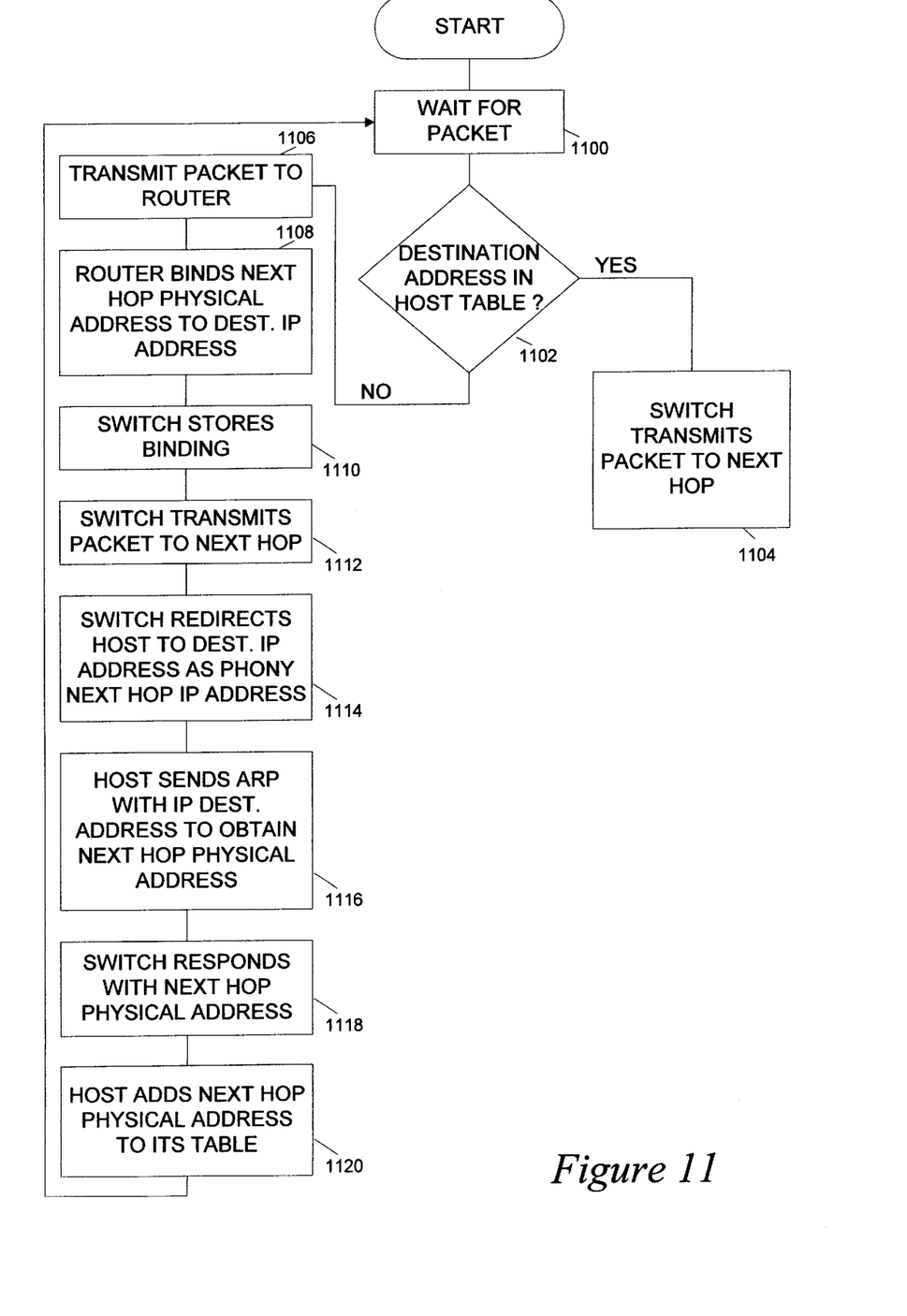
FIG. 11 is a flow chart illustrating the operation of a second embodiment of the present invention.

The operation of one host-centric embodiment is illustrated in FIG. 11. The structure of the router accelerator is essentially the same as that of FIG. 6, except the accelerator does not include the packet forwarding tables, and the router-side table in both host-centric embodiments performs a different function than the router history table, as explained below.

Generally, packets originate at a host. The host determines whether the destination IP address specified by the packet is found in its own host tables (step 1102). If so, then the host uses its ARP cache to send the packet directly to the next hop physical address (step 1104).

If no match, the host forwards the packet to a default router through the intervening router acceleration switch of the invention (step 1106). At this point, the switch just passes the packet to the router.

As before, the router binds the next hop physical address to the destination IP address (step 1108). The router then sends the IP datagram encapsulated in a physical frame with the next hop physical address into the switch router-side port leading to the next hop destination. The packet processing logic 606 at the port 602 then stores the frame in shared memory 612 over the router-side data bus 626. The router-side packet processing logic 606 also instructs the memory controller 620 to output the frame from the shared memory 612 onto the network-side data bus 624, and instructs the packet processing logic 604 of the network port corresponding to the router port to forward it to the next hop (step 1112).

Figure 12:
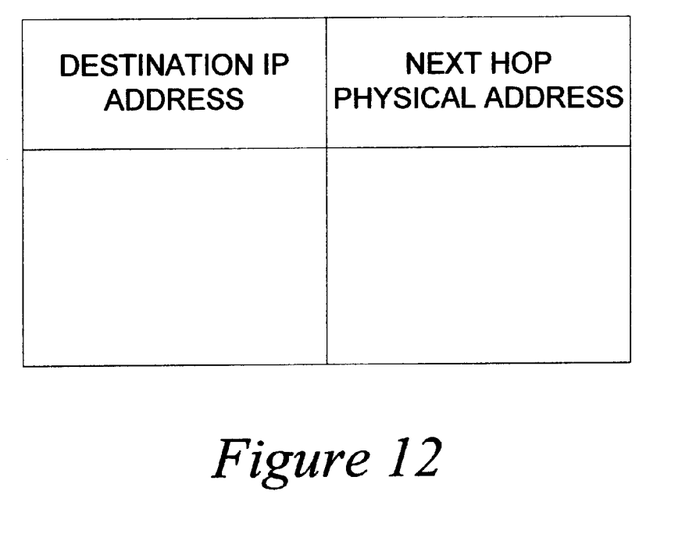
FIG. 12 illustrates an accelerator table employed by the host-syntric embodiments of the present invention.

Before the switch transmits the packet to the next hop, the microprocessor 614 of the accelerator switch stores the destination IP/next hop physical address binding in the router-side table 610 (the "ARP table" in this embodiment) (step 1110). The table for storing this binding is shown in FIG. 12, where the destination IP and next hop physical addresses are associatively stored.

The switch then takes steps to "trick" the host forwarding tables into storing this binding. The switch microprocessor 614 employs the Internet control message protocol (ICMP) to perform this function. The ICMP message is encapsulated in an IP datagram, which is itself encapsulated in a frame for transmission. One type of ICMP message is a redirect message. In conventional systems, routers employ redirect messages to update host routing tables. A host boots up knowing the address of only one router on the local network. This default router returns an ICMP redirect message whenever a host sends a datagram for which there is an initial router along a more optimal path. The redirect message replaces the default router in the table with the address of this more optimal router.

According to the present invention, the microprocessor in the switch sends a redirect message to the host to cause the first host table to associate the destination IP address of the packet with itself so as to act as the next hop IP address in the table (step 1114). Based upon this table entry, the host sends an ARP message to obtain the corresponding physical address (step 1116). In a conventional system, the ARP message would be used to obtain a physical address corresponding to an IP address in the table. Here, because the destination IP address has been substituted for the next hop IP address, a conventional system would attempt to return a physical destination address. However, in a conventional system this would only work if the destination node were within the same local network (broadcast domain) as the host. In contrast, the present invention employs the ARP table of the switch to intercept and respond to the host's ARP request. Recall that the ARP table has already stored the address binding computed by the router. In this manner, the switch acts as an ARP server to return the next hop physical address in response to the IP destination address sent by the host (step 1118). The host then adds this next hop physical address to its ARP cache, the second host table (step 1120).

The switch then waits for the next packet (step 1100). The microprocessor 614 in the switch determines whether the destination address specified by this packet matches a destination address in the ARP cache (step 1102). If so, the host responds with the next hop physical address. The microprocessor, coupled to the host network, then forwards the packet to the next hop destination at layer 2 (step 1104). Subsequent packets directed to the same destination IP address are handled in a similar manner. Through this technique, the host takes much of the burden off of the default router for sending packets to the first hop.

Now that the host knows the next hop IP address and the physical address of the next hop, it will send subsequent packets having that destination IP address directly to the physical address of the next hop. This process can be handled by the conventional layer 2 switching of the switch, which is found in the router-side packet processing logic 606, microprocessor 614 and memory controller 620.

Unlike the previous embodiment, this approach uses existing memory in the host to accomplish functions that would otherwise require memory in the switch. The switch need not store information for every host. Instead, the information is distributed among the hosts. Moreover, the switch only needs the address information one time for the ARP table, instead of maintaining the information for every packet it sends (as in the packet forwarding table of the previous embodiment). Finally, the switch does not need an high-speed memory like a CAM. Instead, it employs a software table for its ARP response function.

Figure 13:
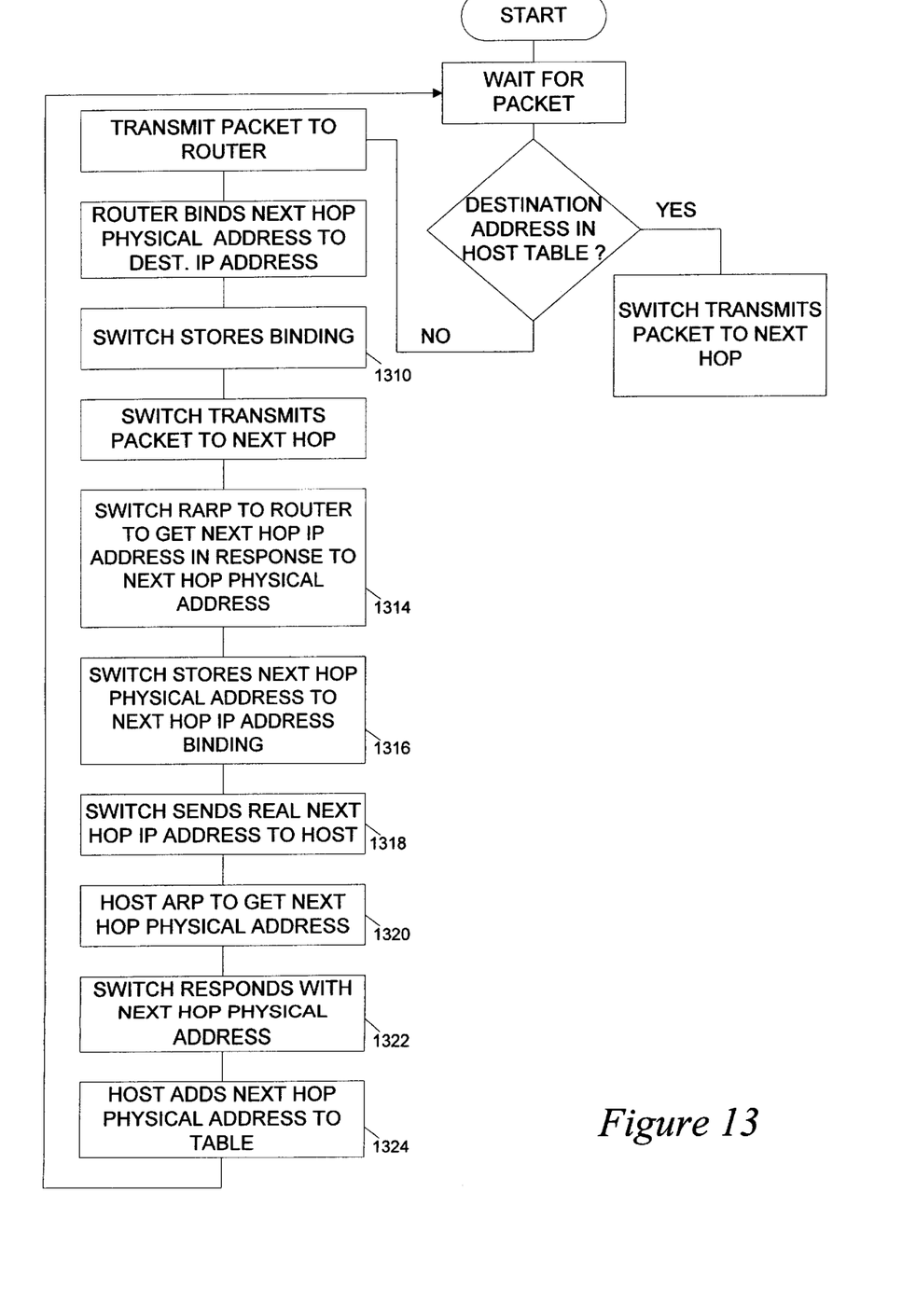
FIG. 13 is a flow chart illustrating the operation of a third embodiment of the present invention.

The operation of a second host-centric embodiment is illustrated in FIG. 13. As can be seen from a comparison with FIG. 11, many of the initial steps are the same. As before, the switch stores the destination IP address/next hop physical address binding in the ARP table in DRAM (step 1310). However, in this embodiment, the switch also employs the reverse address resolution protocol (RARP).

Figure 14:
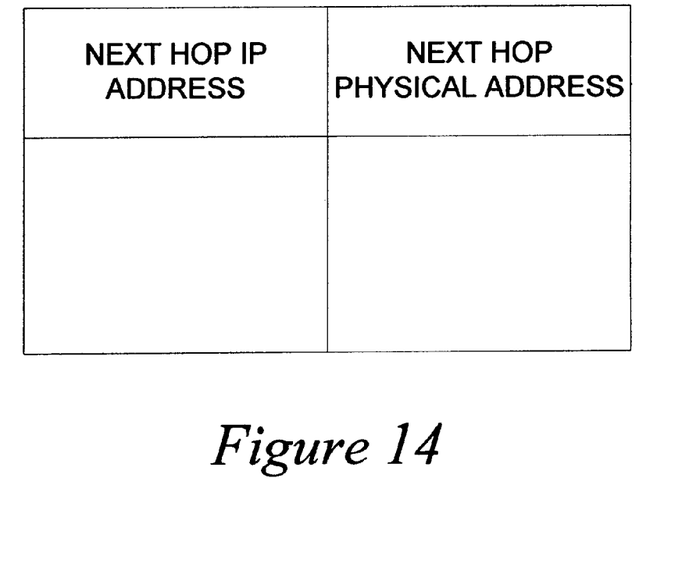
FIG. 14 illustrates a RARP table of the present invention.

The microprocessor 614 in the switch issues to the router a RARP request containing the next hop physical address in order to obtain the next hop IP address from the router (step 1314). According to RARP, a machine on the network sends out a broadcast message containing a physical address to nodes on its local network in order to obtain a corresponding IP address. Conventional routers can act as RARP servers. The microprocessor in the switch stores the RARP next hop physical address/next hop IP address binding in the table illustrated in FIG. 14, which is also stored in DRAM (step 1316).

Unlike the previous embodiment, the switch sends the real next hop IP address to the first host table (step 1318). The host issues an ARP request with this next hop IP address in order to obtain the next hop physical address (step 1320). The switch acts as an ARP server to return the next hop physical address (step 1322). The host adds the next hop physical address to its ARP cache (step 1324). Subsequent packets directed to the same destination IP address then match in the host tables. Again, by filling the host tables with the next hop physical address information, the host can facilitate layer 2 switching, therefore bypassing the router.

The RARP approach does not require the counterfeit redirect message of the previous embodiment. The redirect message of the previous embodiment may be rejected by Internet security systems that are sensitive to such ARP spoofing.

Based on the foregoing, it can be seen that the router accelerator of the present invention need not receive and maintain information about the status of the network or execute routing algorithms. Thus, packet forwarding for the vast majority of packets in a source-destination stream can be performed by the high-speed router accelerator, which is implemented entirely in hardware. Further, performance of the router accelerator is not hampered by the need to maintain and update software for implementing routing algorithms as the algorithms change.

Although the invention has been described in conjunction with particular embodiments, it will be appreciated that various modifications and alterations may be made by those skilled in the art without departing from the spirit and scope of the invention. The invention is not to be limited by the foregoing illustrative details, but rather is to be defined by the amended claims.

What is claimed is:

1. A router accelerator switch comprising:
    a forwarding table for associatively storing a destination address and a next hop address;
    logic for forwarding a packet to a next hop if a destination address of the packet matches a destination address in the forwarding table, wherein an associated router does not process the packet if the packet destination address matches a destination address in the forwarding table, and logic for communicating the packet to the router if the packet destination address does not match a destination address in the forwarding table, wherein the router computes the next hop address corresponding to the destination address of the packet if the packet destination address does not match a destination address in the forwarding table.

2. The router accelerator switch of claim 1, wherein the destination address is a network address and the next hop address is a physical address.

3. The router accelerator switch of claim 1, wherein the router is coupled to at least one network port through the router accelerator switch.

4. The router accelerator switch of claim 3, wherein the router binds the next hop address to the destination address of the packet if the packet destination address does not match a destination address in the forwarding table.

5. The router accelerator switch of claim 1, further comprising a router history table for associatively storing at least one destination address and a corresponding address of a network port that received a packet having that destination address.

6. The router accelerator switch of claim 5, wherein each network port has an associated forwarding table, and the accelerator stores the next hop address in the forwarding table for a port if the port is associated in the history table with a destination address that is bound to the next hop address.

7. In a network having at least one host and at least one router, the host having at least one routing table for associatively storing a second-level destination address, a second-level next hop address and a first-level next hop address, the router for binding a first-level next hop address to a second-level destination address, a router accelerator switch comprising:
    redirect logic for storing the second-level destination address in a second-level next hop address entry in the at least one host routing table to thereby cause the host to request a first-level next hop address corresponding to the second-level destination address;
    an accelerator table for associatively storing the bound second-level destination address and first-level next hop address, wherein the accelerator table responds to the host's request with the bound first-level next hop address.

8. The router accelerator switch of claim 7, wherein first-level addresses are physical addresses and second-level addresses are network addresses.

9. The router accelerator switch of claim 7, wherein the router is coupled to at least one network port through the router accelerator.

10. The router accelerator switch of claim 7, wherein the host associatively stores the bound second-level destination address and first-level next hop address in a host forwarding table.

11. The router accelerator switch of claim 10, wherein the host forwards a packet to a next hop if a second-level destination address of the packet matches a second-level destination address in the host forwarding table.

12. The router accelerator switch of claim 10, wherein a router coupled to the accelerator does not process the packet if the second-level destination address of the packet matches a second-level destination address in the host forwarding table.

13. In a network having at least one host and at least one router, the host having at least one routing table for associatively storing a second-level destination address, a second-level next hop address and a first-level next hop address, the router for binding a first-level next hop address to a second-level destination address, a router accelerator switch comprising:

request logic for requesting from the router a second-level next hop address in response to the first-level next hop address;

redirect logic for storing the second-level next hop address in a second-level next hop address entry in the at least one host routing table to thereby cause the host to request a first-level next hop address corresponding to the second-level next hop address;

an accelerator table for associatively storing the corresponding second-level next hop address and first-level next hop address, wherein the accelerator table responds to the host's request with the bound first-level next hop address.

14. The router accelerator switch of claim 13, wherein first-level addresses are physical addresses and second-level addresses are network addresses.

15. The router accelerator switch of claim 13, wherein the router is coupled to at least one network port through the router accelerator.

16. The router accelerator switch of claim 13, wherein the host associatively stores the bound second-level destination address and first-level next hop address in a host forwarding table.

17. The router accelerator switch of claim 16, wherein the host forwards a packet to a next hop if a second-level destination address of the packet matches a second-level destination address in the host forwarding table.

18. The router accelerator switch of claim 13, wherein a router coupled to the accelerator does not process the packet if the second-level destination address of the packet matches a second-level destination address in the host forwarding table.

19. A method for accelerating a router comprising the steps of:

associatively storing a destination address and a next hop address in a forwarding table of a router accelerator switch; and forwarding a packet to a next hop if a destination address of the packet matches a destination address in the forwarding table, wherein an associated router does not process the packet if the packet destination address matches a destination address in the forwarding table, and communicating the packet to the router if the packet destination address does not match a destination address in the forwarding table, wherein the router computes the next hop address corresponding to the destination address of the packet if the packet destination address does not match a destination address in the forwarding table.

20. The method of claim 19, wherein the destination address is a network address and the next hop address is a physical address.

21. The method of claim 19, wherein the router is coupled to at least one network port through the router accelerator.

22. The method of claim 21, further comprising the step of the router binding the next hop address to the destination address of the packet if the packet destination address does not match a destination address in the forwarding table.

23. The method of claim 19, further comprising the step of associatively storing in a router history table at least one destination address and a corresponding address of a network port that received a packet having that destination address.

24. The method of claim 23, wherein each network port has an associated forwarding table, the method further comprising the step of storing the next hop address in the forwarding table for a port if the port is associated in the history table with a destination address that is bound to the next hop address.

25. In a network having at least one host and at least one router, the host having at least one routing table for associatively storing a second-level destination address, a second-level next hop address and a first-level next hop address, the router for binding a first-level next hop address to a second-level destination address, a method for accelerating the router comprising the steps of:

storing the second-level destination address in a second-level next hop address entry in the at least one host routing table to thereby cause the host to request a first-level next hop address corresponding to the second-level destination address; and associatively storing in an accelerator table the bound second-level destination address and first-level next hop address, wherein the accelerator table responds to the host's request with the bound first-level next hop address.

26. The method of claim 25, wherein first-level addresses are physical addresses and second-level addresses are network addresses.

27. The method of claim 25, wherein the router is coupled to at least one network port through the router accelerator.

28. The method of claim 25, wherein the host associatively stores the bound second-level destination address and first-level next hop address in a host forwarding table.

29. The method of claim 28, wherein the host forwards a packet to a next hop if a second-level destination address of the packet matches a second-level destination address in the host forwarding table.

30. The method of claim 28, wherein a router coupled to the accelerator does not process the packet if the second-level destination address of the packet matches a second-level destination address in the host forwarding table.

31. In a network having at least one host and at least one router, the host having at least one routing table for associatively storing a second-level destination address, a second-level next hop address and a first-level next hop address, the router for binding a first-level next hop address to a second-level destination address, a method for accelerating the router comprising the steps of:

requesting from the router a second-level next hop address in response to the first-level next hop address;

storing the second-level next hop address in a second-level next hop address entry in the at least one host routing table to thereby cause the host to request a first-level next hop address corresponding to the second-level next hop address;

associatively storing in an accelerator table the corresponding second-level next hop address and first-level next hop address, wherein the accelerator table responds to the host's request with the bound first-level next hop address.

32. The method of claim 31, wherein first-level addresses are physical addresses and second-level addresses are network addresses.

33. The method of claim 31, wherein the router is coupled to at least one network port through the router accelerator.

34. The method of claim 31, wherein the host associatively stores the bound second-level destination address and first-level next hop address in a host forwarding table.

35. The method of claim 34, wherein the host forwards a packet to a next hop if a second-level destination address of the packet matches a second-level destination address in the host forwarding table.

36. The method of claim 31, wherein the router does not process a packet if the second-level destination address of the packet matches a second-level destination address in the host forwarding table.

* * * * *